(12) United States Patent
Palmer et al.

(10) Patent No.: US 12,204,339 B2
(45) Date of Patent: Jan. 21, 2025

(54) MOBILE AUTONOMOUS AGRICULTURAL SYSTEM AND METHOD

(71) Applicant: S&A GROUP HOLDINGS LIMITED, Hereford (GB)

(72) Inventors: Edward John Francis Palmer, Herefordshire (GB); Koorosh Khodabandehloo, Devon (GB)

(73) Assignee: S&A GROUP HOLDINGS LIMITED, Marden (GB)

( * ) Notice: Subject to any disclaimer, the term of this patent is extended or adjusted under 35 U.S.C. 154(b) by 282 days.

(21) Appl. No.: 17/893,758

(22) Filed: Aug. 23, 2022

(65) Prior Publication Data

US 2023/0059246 A1 Feb. 23, 2023

(30) Foreign Application Priority Data

Aug. 23, 2021 (GB) ..................... 2112083

(51) Int. Cl.
*A01D 46/30* (2006.01)
*G01S 17/88* (2006.01)
(Continued)

(52) U.S. Cl.
CPC ........... *G05D 1/0231* (2013.01); *A01D 46/30* (2013.01); *G01S 17/88* (2013.01); *G05D 1/0274* (2013.01);
(Continued)

(58) Field of Classification Search
CPC ...... A01D 34/008; A01D 46/30; A01D 75/20; A01D 75/185; G05B 13/02; G05D 1/0231;
(Continued)

(56) References Cited

U.S. PATENT DOCUMENTS 10,890,912 B2 * 1/2021 Cavender-Bares ...... A01C 7/00
11,383,703 B2 * 7/2022 Nishi ....................... G05D 1/02
(Continued)

FOREIGN PATENT DOCUMENTS

EP          3572897 A1   11/2019
WO       2020076616 A1    4/2020

OTHER PUBLICATIONS

UK Search Report for App. No. GB2112083.7; May 5, 2022; 3 pgs.

*Primary Examiner* — Christian Chace
*Assistant Examiner* — Richard Edwin Geist
(74) *Attorney, Agent, or Firm* — Perilla Knox & Hildebrandt LLP

(57) ABSTRACT

There is provided a mobile autonomous agricultural system comprising: a powered mobile unit for carrying agricultural equipment, and configured to move along rows of crops; at least one laser curtain sensor configured to project a laser curtain away from the mobile unit; a location module configured to monitor a location of the mobile unit relative to a row; a controller configured to control the travel of the mobile unit; a safety module configured to: receive a location signal from the location module related to the location of the mobile unit relative to a row, select a mode of operation to process the laser curtain in a predefined laser curtain pattern, based on the received location signal, each mode of operation corresponding to a different predefined laser curtain pattern, and to generate a safety output in response to determining that the laser curtain is interrupted within the laser curtain pattern.

19 Claims, 8 Drawing Sheets

Figure 1:
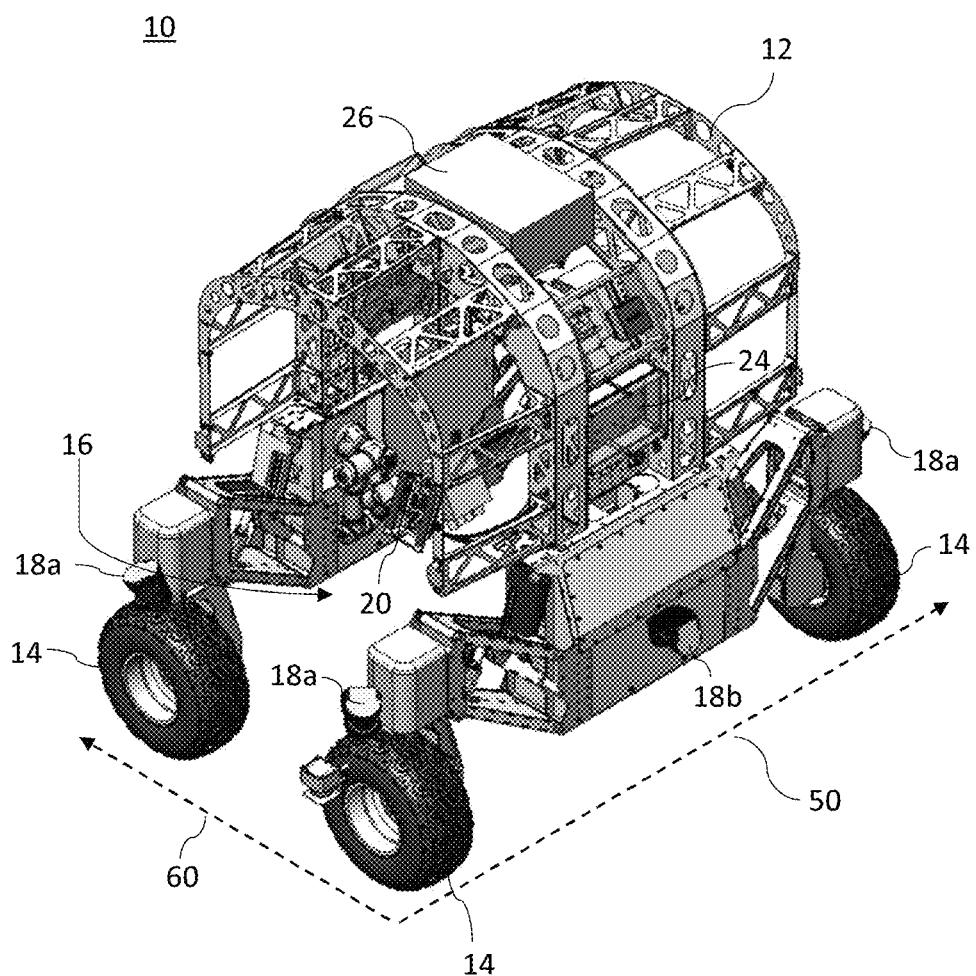

(51) Int. Cl.
*G05D 1/00* (2024.01)
*A01B 79/00* (2006.01)
*G01S 17/931* (2020.01)
*G05D 1/622* (2024.01)

(52) U.S. Cl.
CPC .......... *A01B 79/005* (2013.01); *G01S 17/931* (2020.01); *G05D 1/637* (2024.01)

(58) Field of Classification Search
CPC .... G05D 1/0274; G05D 1/637; G05D 1/0214; G01S 17/88; G01S 17/931
See application file for complete search history.

(56) References Cited

U.S. PATENT DOCUMENTS

| | | | |
|---|---|---|---|
| 11,408,991 B2* | 8/2022 | Ingram | G01S 13/931 |
| 12,005,930 B2* | 6/2024 | Schmitz | B60W 30/09 |
| 2022/0244731 A1* | 8/2022 | Suzuki | G05D 1/0219 |
| 2022/0264784 A1* | 8/2022 | Iwase | G05D 1/0088 |
| 2022/0400598 A1* | 12/2022 | Tamatani | A01B 69/008 |
| 2024/0130266 A1* | 4/2024 | Andreu | B62D 49/0607 |

* cited by examiner

MOBILE AUTONOMOUS AGRICULTURAL SYSTEM AND METHOD

TECHNICAL FIELD

The present invention relates to a mobile autonomous agricultural system and a method of controlling a powered mobile unit.

BACKGROUND

Many agricultural tasks to improve yield and quality of crops, or to harvest crops, (particularly soft fruit crops) require time-consuming manual labor. However, many of the tasks required are repetitive and may therefore be suitable for help by autonomous machinery. Such autonomous machinery would typically be required to autonomously move around and between crops, and therefore presents a safety risk to people working in or around the crops or other users of the machinery.

SUMMARY OF THE INVENTION

According to a first aspect, there is provided a mobile autonomous agricultural system comprising: a powered mobile unit for carrying agricultural equipment, and configured to move along rows of crops; at least one laser curtain sensor configured to project a laser curtain away from the mobile unit; a location module configured to monitor a location of the mobile unit relative to a row; a controller configured to control the travel of the mobile unit; a safety module configured to: receive a location signal from the location module related to the location of the mobile unit relative to a row, select a mode of operation to process the laser curtain in a predefined laser curtain pattern, based on the received location signal, each mode of operation corresponding to a different predefined laser curtain pattern, and to generate a safety output in response to determining that the laser curtain is interrupted within the laser curtain pattern.

The safety output may be a signal to control the mobile unit to slow or to stop. The mobile unit may comprise an arch profile extending along an axial direction.

The mobile autonomous agricultural system may comprise a plurality of laser curtain sensors distributed around the mobile unit configured together to form the laser curtain. Each laser curtain sensor may be configured to project a respective laser plane which overlaps with at least one other laser plane to form the laser curtain.

The safety module may be configured to select a default mode of operation unless any deviating criteria are met. The default mode may comprise processing the laser curtain in a laser curtain pattern which extends from the mobile unit in an axial direction up to a maximum axial distance from the mobile unit, and in a width direction, perpendicular to the axial direction, up to a maximum width distance from the mobile unit.

The deviating criteria may comprise a first deviating criterion comprising the mobile unit being controlled to move from one row to another row, wherein when the first deviating criterion is met, the safety mode is configured to select a crabbing mode. The crabbing mode may comprise processing the laser curtain in a laser curtain pattern which extends from the mobile unit along the axial direction up to a minimum axial distance, and in a width direction, perpendicular to the axial direction, up to a maximum width distance.

The deviating criteria may comprise a second deviating criterion comprising the mobile unit being controlled to approach a row, and then determining that the mobile unit is within a first threshold distance from an end of the row, such that when the mobile unit is determined to be within the first threshold distance from an end of a row, the safety module is configured to select an entry mode. The entry mode may comprise processing the laser curtain to the same extent as the default mode or a crabbing mode, but excluding from processing a channel in the laser curtain corresponding to the position of the row.

The deviating criteria may comprise a third deviating criterion comprising the mobile unit being within a second threshold distance from an end of a row or within the row, such that when the third deviating criterion is met, the safety module is configured to select a row mode. The row mode may comprise processing the laser curtain to form a laser curtain pattern which extends from the mobile unit along the axial direction up to a maximum axial distance, and in a width direction, perpendicular to the axial direction, up to a minimum width distance.

The mobile autonomous agricultural system may comprise at least one robot arm configured to perform agricultural tasks, and the safety output may be a signal to control the robot arm or arms to stop.

For each mode of operation, each predefined laser curtain pattern, which the safety module is configured to process, may extend downwards from the laser curtain sensors, up to a threshold ground distance from the ground. The threshold distance may be 10-50 cm from the ground.

The laser curtain sensor may be configured to monitor and map the ground surface. The safety module may be configured to dynamically alter the predefined laser curtain pattern for each mode of operation based on the mapped ground surface.

When the laser curtain sensor determines that there is an inclination in the local ground surface around the mobile unit beyond a threshold inclination, the safety module may be configured to dynamically alter the laser curtain pattern which is processed, by making shorter an axial extent of the laser curtain pattern or a width extent, perpendicular to the axial direction.

According to a second aspect, there is provided a method of controlling a powered mobile unit of a mobile autonomous agricultural system according to any preceding claim, the mobile unit configured to carry agricultural equipment and configured to move along rows of crops, the method comprising: projecting a laser curtain away from the mobile unit; determining a location of the mobile unit relative to a row; selecting a mode of operation, to process the laser curtain in a predefined laser curtain pattern, based on the determined location of the mobile unit relative to the row, wherein each mode of operation comprises processing a different predefined laser curtain pattern; generating a safety output in response to determining that the laser curtain is interrupted within the laser curtain pattern.

The safety output may be a signal to control the mobile unit to slow or stop. The mobile unit may comprise an arch profile extending along an axial direction.

The laser curtain may be projected to surround the mobile unit.

The method may comprise selecting a default mode unless any deviating criteria is met. The default mode may comprise processing the laser curtain in a laser curtain pattern which extends from the mobile unit in an axial direction up to a maximum axial distance from the mobile unit, and in a width direction, perpendicular to the axial direction, up to a maximum width distance from the mobile unit.

The deviating criteria may comprise a first deviating criterion comprising the mobile unit being controlled to move from one row to another row, and determining that the mobile unit is within a first threshold distance from an end of a row, wherein when the first deviating criterion is met the method comprises selecting a crabbing mode. The crabbing mode may comprise processing the laser curtain in a laser curtain pattern which extends from the mobile unit along the axial direction up to a minimum axial distance, and in a width direction, perpendicular to the axial direction, up to a maximum width distance.

The deviating criteria may comprise a second deviating criterion comprising the mobile unit being controlled to approach a row, and determining that the mobile unit is within a first threshold distance from an end of a row, such that when the second deviating criterion is met, the method comprises selecting an entry mode. The entry mode may comprise processing the laser curtain to the same extent as a default mode or a crabbing mode, but excluding from processing a channel in the laser curtain corresponding to the location of the row.

The deviating criteria may comprise a third deviating criterion comprising the mobile unit being within a second threshold distance from an end of a row, such that when the third deviating criterion is met, the method comprises selecting a row mode. The row mode may comprise processing the laser curtain to form a laser curtain pattern which extends from the mobile unit along the axial direction up to a maximum axial distance, and in a width direction, perpendicular to the axial direction, up to a minimum width distance.

The safety output may be a signal to control robot arms on the mobile unit to stop.

For each mode of operation, each predefined laser curtain pattern, which the safety module is configured to process, may extend up to a threshold ground distance off the ground. The threshold ground distance may be 10-50 cm from the ground.

The method may comprise monitoring and mapping the ground surface and dynamically altering the predefined laser curtain pattern for each mode of operation based on the monitored ground surface.

The method may comprise determining that there is an inclination in the ground surface above an inclination threshold, based on the mapped ground surface, and dynamically altering the laser curtain pattern by making shorter an axial extent of the laser curtain pattern or a width extent, perpendicular to the axial direction.

According to a third aspect, there is provided a non-transitory computer-readable storage medium, a signal or a computer program comprising computer-readable instructions that, when read by a computer, causes the performance of a method in accordance with the second aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWING FIGURES

Figure 2:
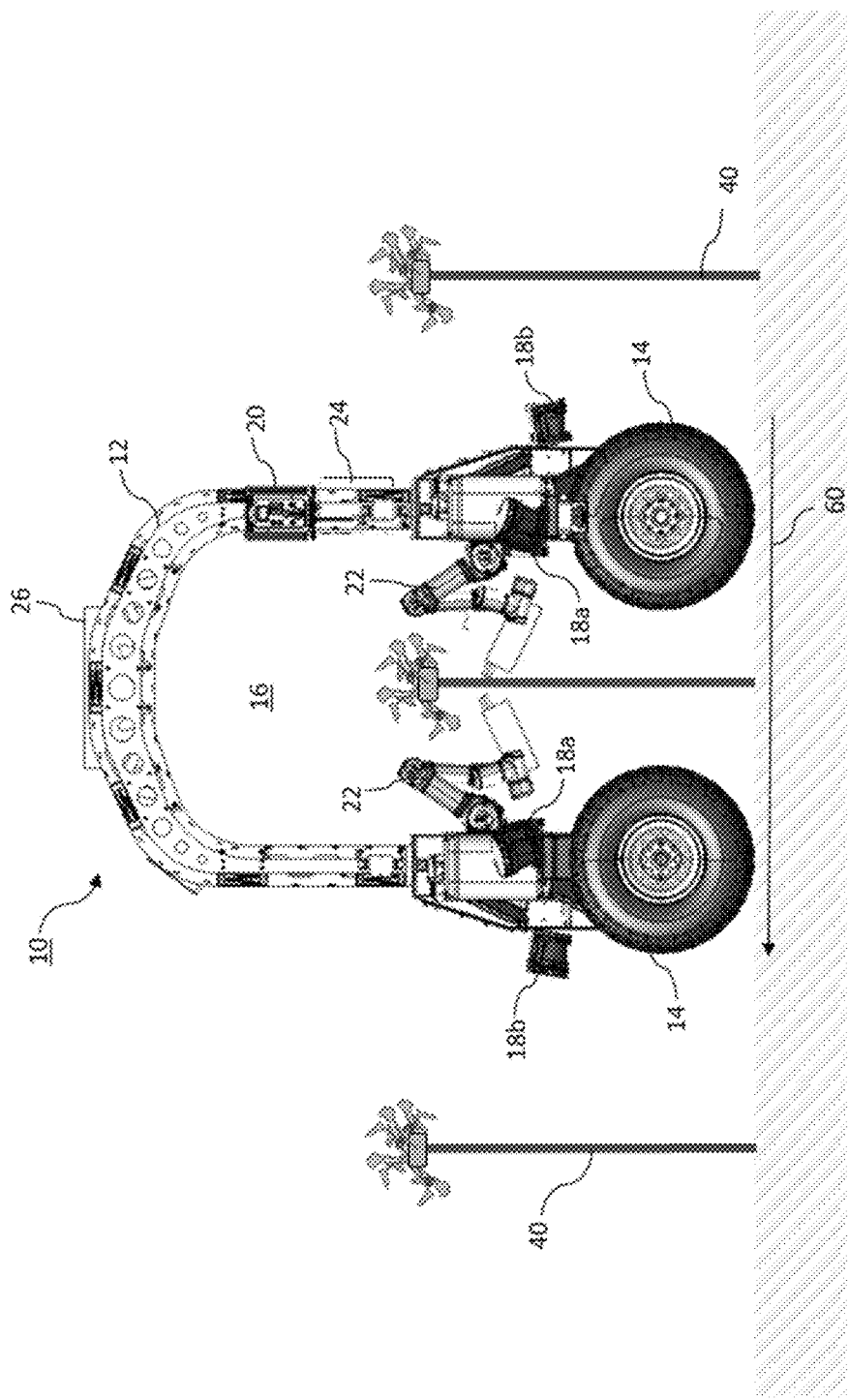
Figure 3:
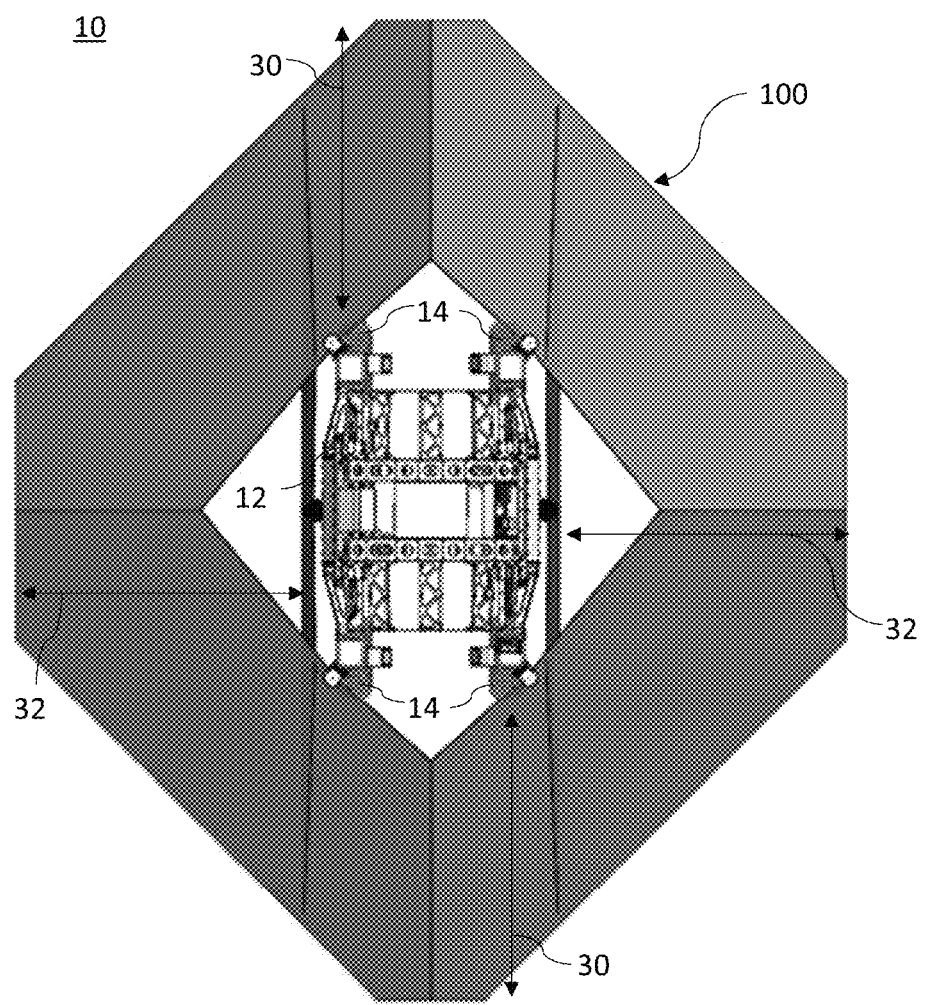
Figure 4:
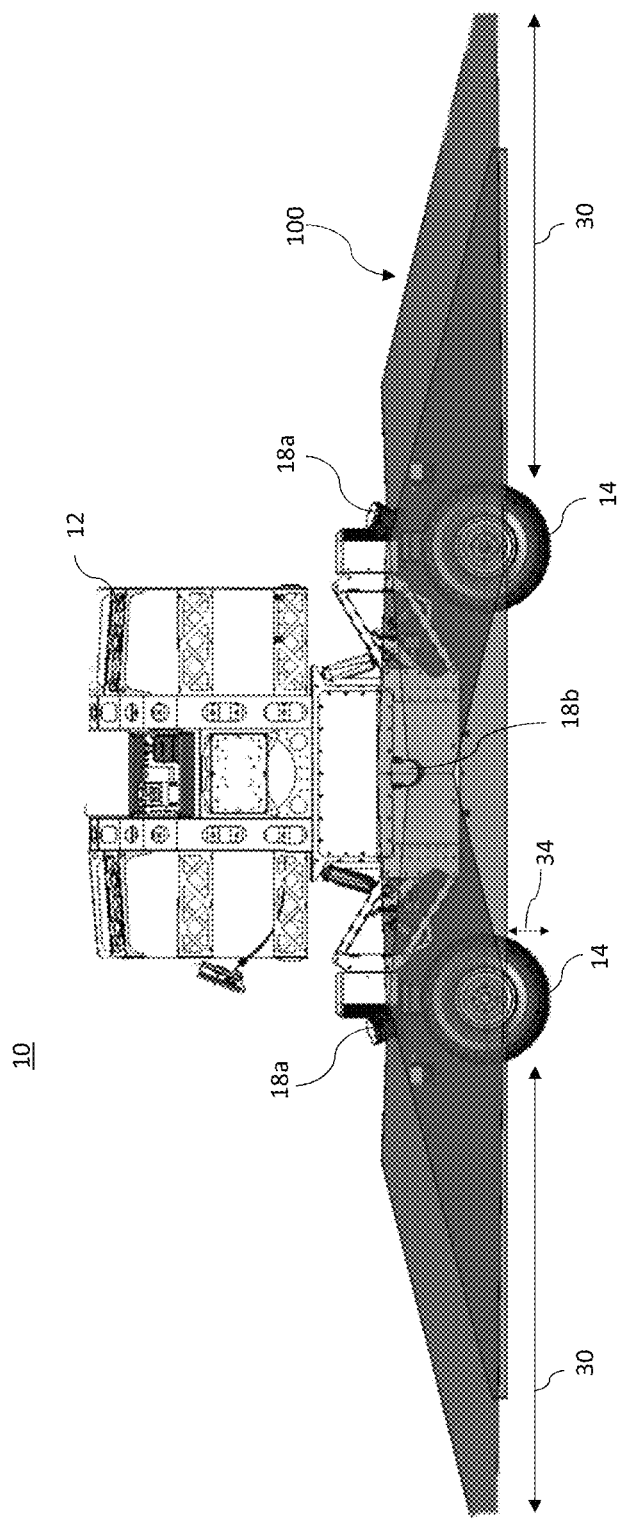
Figure 5:
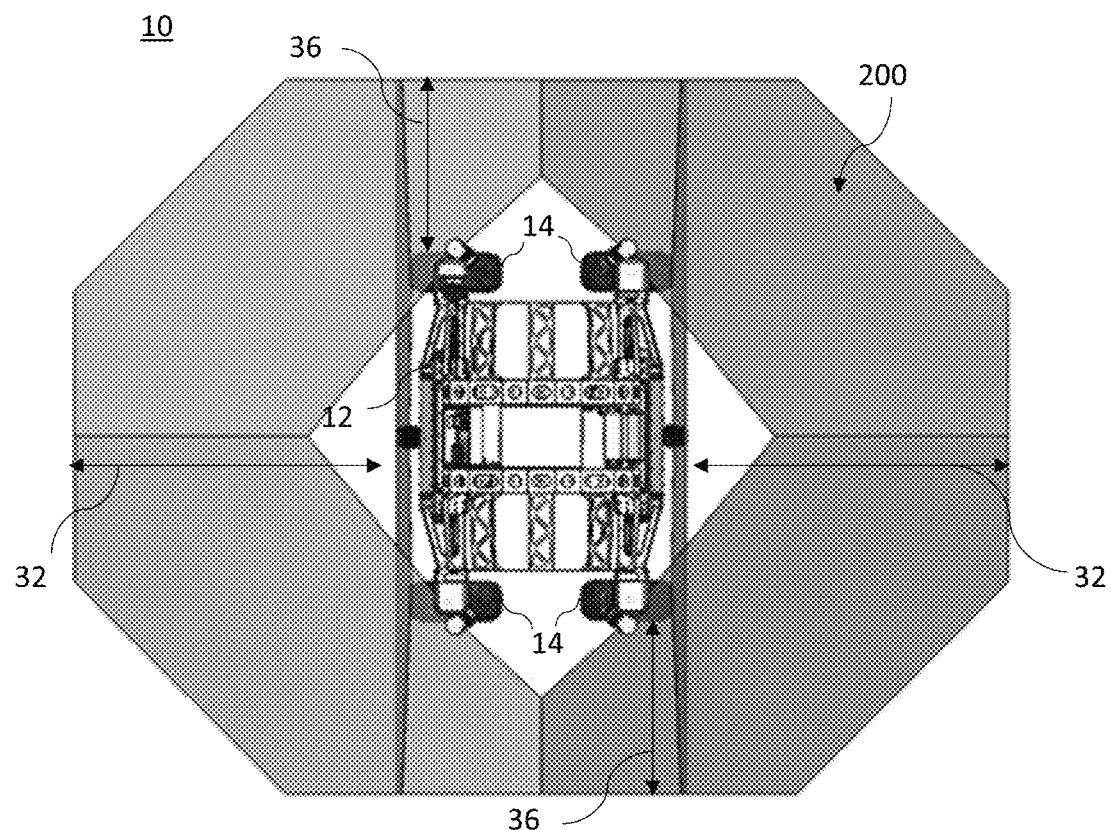
Figure 5:
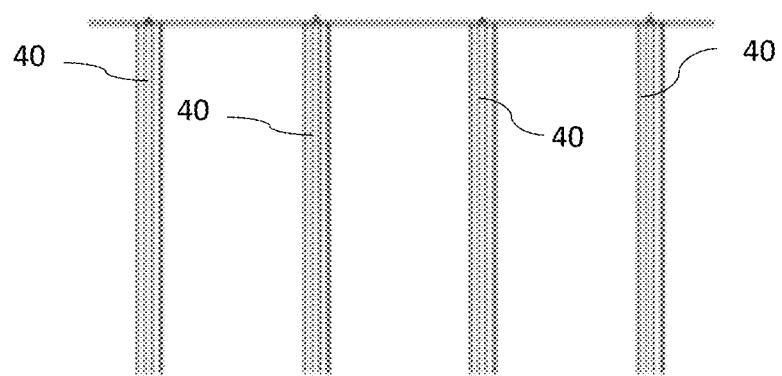
Figure 6:
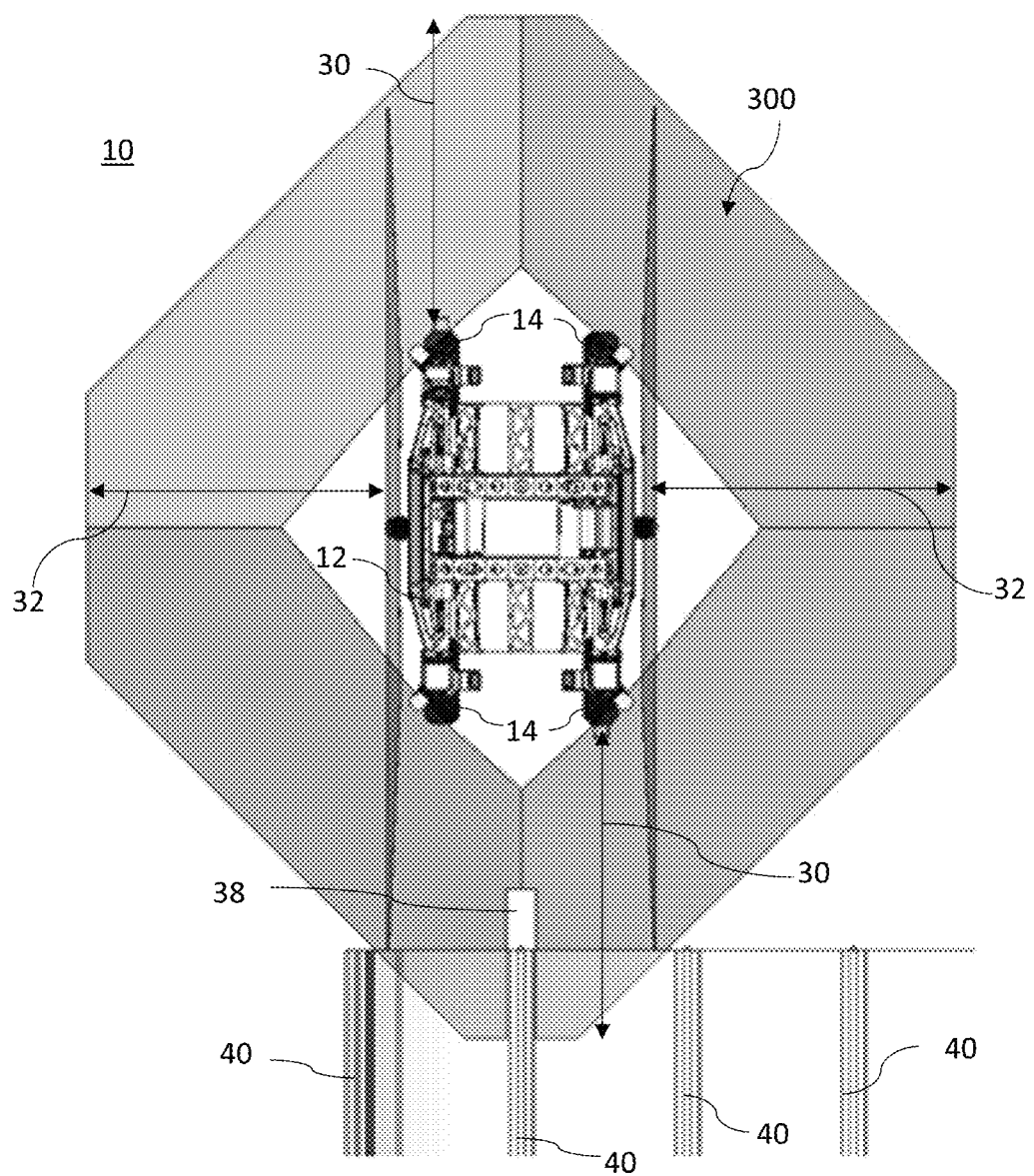
Figure 7:
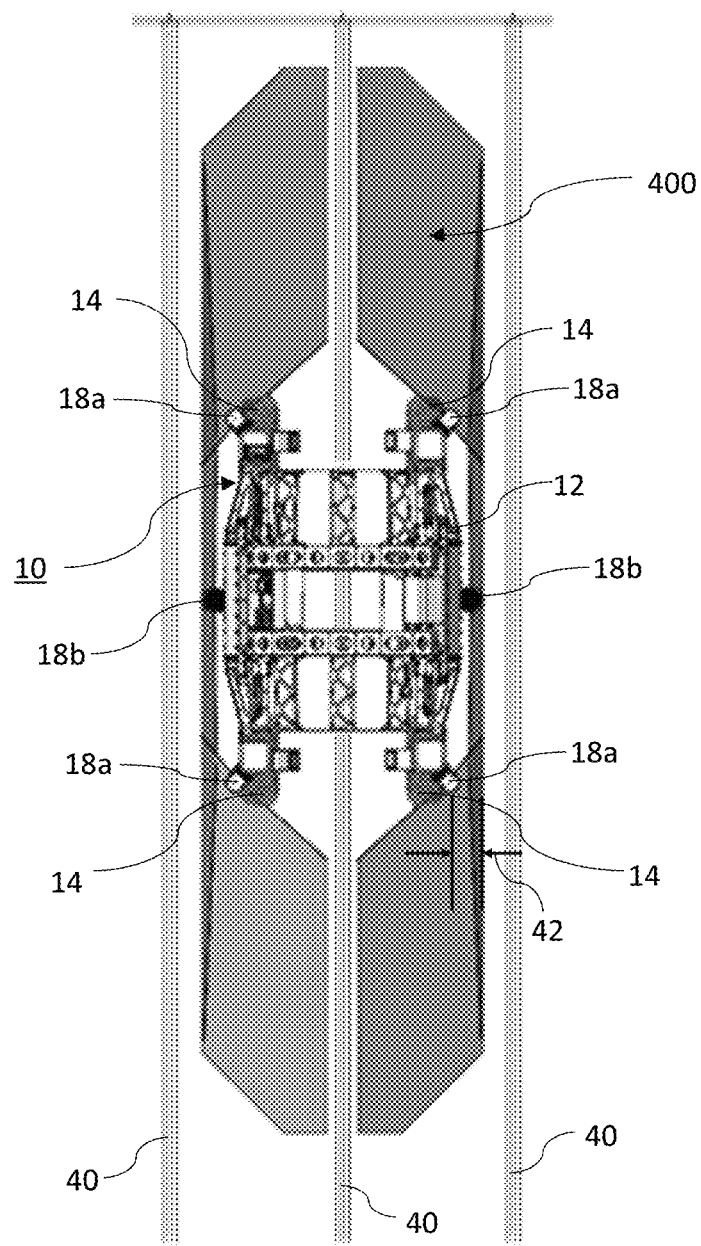
Figure 8:
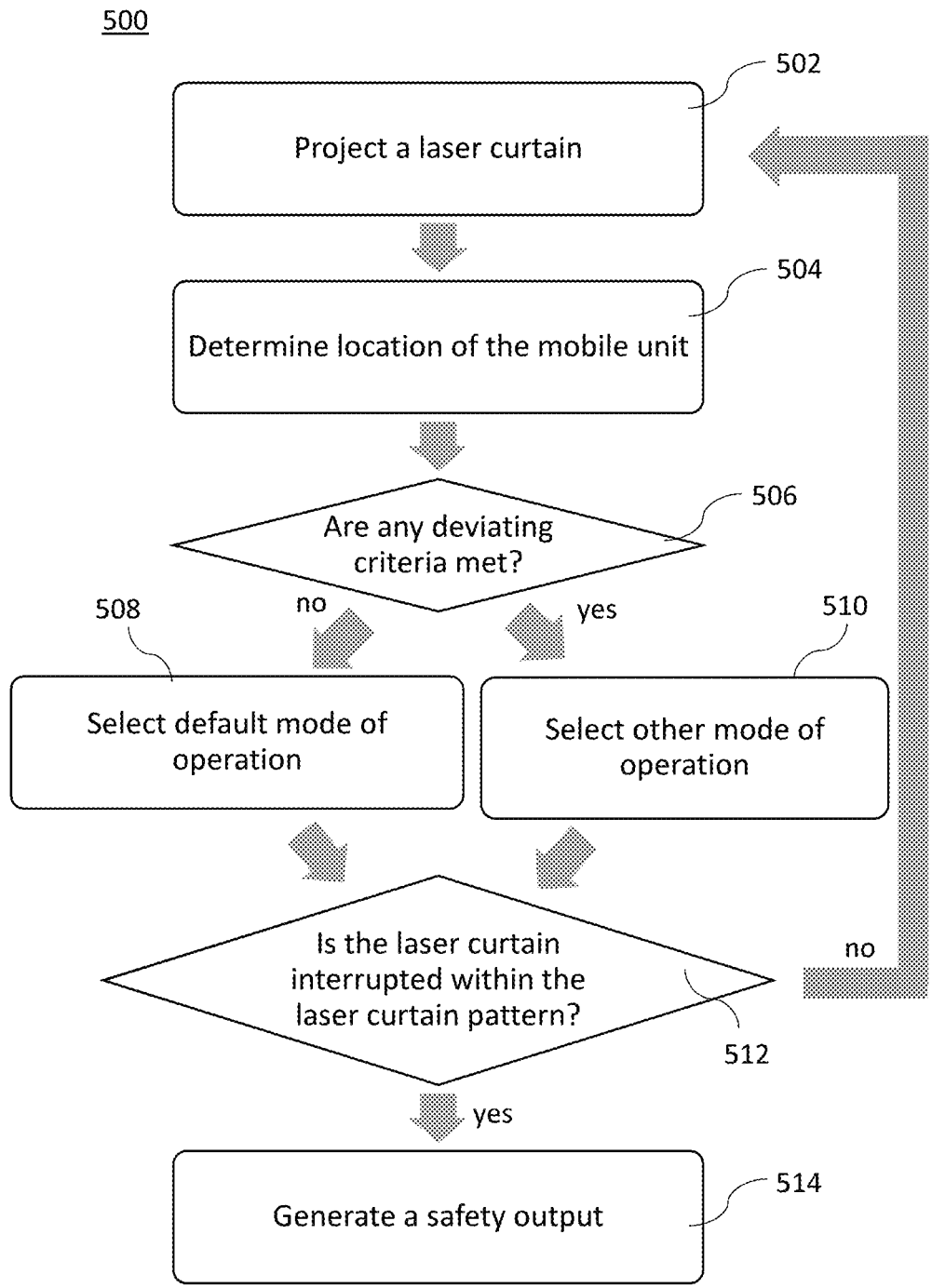

Embodiments will now be described, by way of example only, with reference to the accompanying Figures, in which:

FIG. 1 schematically shows an isometric view of a mobile autonomous agricultural system;

FIG. 2 schematically shows a front view of the mobile autonomous agricultural system of FIG. 1;

FIGS. 3 and 4 schematically respectively show a top view and a side view of the mobile autonomous agricultural system with a laser curtain pattern in a default mode;

FIGS. 5 to 7 schematically show a top view of the mobile autonomous agricultural system with a laser curtain pattern in a crabbing mode, an entry mode and a row mode respectively; and FIG. 8 is a flow chart showing steps of a method of controlling a powered mobile unit of the mobile autonomous agricultural system.

DETAILED DESCRIPTION OF EXAMPLE EMBODIMENTS

Referring now in detail to the drawing figures, in which like reference numerals represent like elements throughout the several views, FIGS. 1 and 2 show a mobile autonomous agricultural system 10 comprising a powered mobile unit 12. The mobile autonomous agricultural system 10 is configured to operate along rows 40 of crops (best shown in FIG. 2, with each row 40 shown extending into the page) to perform agricultural tasks, such as harvesting, husbandry, or monitoring the crops.

In this example, the mobile unit 12 comprises an arch profile extending along an axial direction 50. In other words, at any point in the axial direction, a cross section of the mobile unit 12 comprises an arch profile. In this example, distal ends of arms of the arch are fixed to powered wheels 14 (which are pivotable with respect to the mobile unit 12 for steering) and extend away from the wheels 14 to an apex of the arch. In this example, each distal end of the arch is attached to two wheels 14, such that the whole arch is supported on the ground by a total of four wheels 14. It will be appreciated that in other examples, any suitable number of wheels may be used, or any other suitable device for propelling the mobile unit 12 may be used.

The arch profile of the mobile unit 12 defines an inner zone 16, in the form of a tunnel extending along the axial direction 50, within which agricultural equipment 22 is disposed such that it is protected from damage. The agricultural equipment 22 in this example comprises robot arms. In other examples, it may include UV tubes or any other suitable equipment for carrying out agricultural tasks. The arch profile further allows the mobile unit 12 to traverse along rows 40 of crops, which are raised above the ground on posts (for ease of accessibility), with a single row 40 of crops extending through the inner zone 16 along the axial direction 50, and simultaneously accessible by the agricultural equipment from two sides of the row 40. In some examples, the crops may be disposed on the ground, and the mobile unit may comprise any suitable profile to access the crops on the ground.

The mobile autonomous agricultural system 10 comprises a controller 20 which is configured to control the travel of the mobile unit 12. In this example, in an autonomous mode, the controller 20 is configured to autonomously move the mobile unit 12 along the rows 40 of crops, and between the rows 40, where the rows may comprise a straight line of crops, or any other line of crops with a non-linear profile. In other words, the controller 20 is configured to align the axial direction 50 of the inner zone 16 of the mobile unit 12 with a first row 40 of crops such that the arch profile is centered and aligned with the row 40 of crops, and to move the mobile unit 12 to approach the first row 40, and continue to move the mobile unit 12 along the row 40, with the first row 40 received in the inner zone 16 until it reaches an end of the row 40. At the end of the row 40, the controller 20 is configured to control the mobile unit 12 to exit the row 40, travel a predetermined distance away from the row 40, and traverse towards an adjacent row 40 to begin the process again with the adjacent row 40. In this example, the mobile autonomous agricultural system 10 may also be operated in a manual mode, in which a user can manually control the movement of the mobile unit 12, for example up to a first row 40, at which point the user may activate the autonomous mode.

In this example, the autonomous mode of the mobile autonomous agricultural system 10 provides for autonomous movement between adjacent rows 40 of crops, in a single polytunnel of plants, and also from one polytunnel to another.

During this autonomous movement, it is important that people around the mobile autonomous agricultural system 10 are kept safe. For example, during the approach of the mobile unit 12 towards a row 40, there is a risk of crushing a person between the mobile unit 12 and the row 40. Further, there are also risks during movement of the mobile unit 12 along the row 40, and outside the row 40 which must be mitigated to ensure the safety of people around the mobile unit 12.

To this end, the agricultural system 10 comprises a plurality of laser curtain sensors 18 distributed around the mobile unit 12. In this example, there are six laser curtain sensors 18, with one corner laser curtain sensor 18a disposed at each of four corners of the mobile unit 12, which in this example is by each wheel 14, and one side laser curtain sensor 18b disposed on each side of the mobile unit 12 between two wheels 14 in the axial direction 50.

The laser curtain sensors 18 are each configured to project a respective laser plane towards the ground, and each laser plane overlaps with at least one other laser plane, so as together to form a laser curtain surrounding the mobile unit 12. Each laser curtain sensor 18 can detect when its respective laser plane is interrupted by sensing reflected waves of emitted laser beam light. Specifically, the two side laser curtain sensors 18b project a laser plane close to vertically downwards such that the respective laser planes are not interrupted by the wheels 14 if the wheels are rotated by 90 degrees, and so that the respective laser planes are not interrupted by adjacent rows 40 when the mobile unit 12 is moving along a row 40. As is explained in more detail below, this helps to reduce the risk of erroneous generation of a safety output. When the distance between rows is larger, the side laser curtains may be angled away from the mobile unit, or when the distance between the rows is narrow and constraining, and the wheels are smaller or do not rotate, then the side laser curtains may be angled towards the mobile unit.

Each corner laser curtain sensor 18a is configured to project a laser plane angled downwards with respect to the horizontal to project away from the mobile unit 12, such that each laser plane from the corner laser curtain sensors 18a overlaps with the laser plane from an adjacent corner laser curtain sensor 18a, and so that the laser plane from each side laser curtain sensor 18b overlaps (or meets) with the laser planes from the adjacent corner laser curtain sensors 18a.

This particular configuration of laser curtain sensors 18 ensures that the mobile unit 12 is wholly surrounded by the laser curtain such that the presence of an object such as a person can be detected anywhere around the mobile unit 12.

It will be appreciated that there may be any suitable number of laser sensors for the particular application of the mobile autonomous agricultural system, such as one laser curtain sensor, or more than one laser curtain sensor.

The mobile autonomous agricultural system 10 further comprises a location module 24 which is configured to monitor a location of the mobile unit 12 relative to a row 40. The location module 24 may comprise GPS or any other suitable sensor which can be used to identify the location of the mobile unit relative to a row.

The mobile autonomous agricultural system 10 further comprises a safety module 26 which is configured to receive a location signal from the location module 24, related to the location of the mobile unit 12 relative to a row 40, and to select a mode of operation based on the received location signal. Each mode of operation comprises processing the laser curtain in a different predefined laser curtain pattern to monitor interruptions to the laser curtain within the laser curtain pattern, as explained below with reference to FIGS. 3-7.

For each mode of operation, the safety module 26 is configured to generate a safety output in response to determining that the laser curtain is interrupted within the laser curtain pattern of the respective mode of operation. Therefore, any interruptions of the laser curtain outside the laser curtain pattern are ignored by the safety module.

In this example, the safety output includes sending a signal to the controller to control the mobile unit 12 to stop, and to control the robot arms 22 to stop. The safety output bringing the mobile unit to instant halt when the laser curtain pattern is interrupted, and the laser curtain patterns changing between modes, provides the compliance to regulation legislated for use of an autonomous system where there are likely to be people in the vicinity, while improving operation capability for the mobile unit not to be erroneously halted by anything not related to people straying too close to the mobile unit. Such solutions are currently unavailable for use in the agricultural environment where a crop is planted in rows. In some examples, the safety output signal may be to slow the mobile unit or to slow the robot arms. In other examples, the safety output may alternatively or additionally comprise producing an alarm, such as actuating an audible alarm on the mobile unit, or an alarm remote from the mobile unit to an operator, to alert the operator to the potential threat to safety of a person, or to alert the operator to the immobilising of the mobile unit or robot arms, such that they can restart the mobile unit or robot arms when it is determined to be safe again.

Although the location module, the safety module and the controller have been described as separate components, it will be appreciated that they can be incorporated into a single unit.

Further, although it has been described that the profile of the mobile unit defines an arch with distal ends of the arch fixed to wheels, in other examples, the mobile unit may have any suitable profile, or the arch profile may be inverted so that a portion of the arch at the apex is fixed to wheels and the distal ends extend upwards, away from the wheels and the ground. This can be used in situations where the crops are suspended from above, such that an inner zone between arms of the arch receives the suspended crop, and the crop is accessible to agricultural equipment in the arch from two sides simultaneously. For these examples, and the specific example described above, the axial direction may be the direction on the mobile unit which is configured to be parallel to a row while the controller controls the mobile unit to move along the row.

FIGS. 3 and 4 show the mobile autonomous agricultural system 10 with a laser curtain pattern 100 in a default mode. The default mode is selected by the safety module 26 unless any deviating criteria are met. For example, the default mode in this example is selected when the mobile unit 12 is outside the rows 40 of crops and is moving from a location at which it has been switched from the manual mode to the autonomous mode, and when the mobile unit 12 is moving from one polytunnel comprising rows 40 of crops to another polytunnel comprising rows 40 of crops. During these periods, no deviating criteria are met.

In this example, the laser curtain pattern 100 in the default mode extends from each of the wheels 14, away from the mobile unit 12, in the axial direction 50 up to a maximum axial distance 30, which in this example is 2 m. The laser curtain pattern 100 in the default mode also extends from each of the wheels 14, away from the mobile unit 12, in a width direction 60, which is perpendicular to the axial direction 50, up to a maximum width distance 32, which in this example is 2 m.

Therefore, when a person or other unexpected object strays within 2 m of the wheels 14 of the mobile unit 12 when in the default mode, the safety module 26 determines that the laser curtain is interrupted within the laser curtain pattern 100 for the default mode, and generates the safety output.

In other examples, the maximum axial distance and the maximum width distance may be any suitable distance, such as between 1-3 m.

FIG. 5 shows the mobile autonomous agricultural system 10 with a laser curtain pattern 200 in a crabbing mode. The crabbing mode is selected by the safety module 26 when a first deviating criterion is met. In this example, the first deviating criterion comprises the mobile unit 12 being controlled to move, outside the rows 40 of crops, from one row 40 to align with another row 40.

In this example, the laser curtain pattern 200 in the crabbing mode extends from the wheels 14 of the mobile unit 12, along the axial direction 50 up to a minimum axial distance 36, and in the width direction 60 up to the maximum width distance 32. In this example, the minimum axial distance 36 is 0.8 m, and the maximum width distance 32 is the same as for the default mode. Therefore, the laser curtain pattern 200 for the crabbing mode in this example is similar to the default mode except that the axial distance is shorter. This is because, in the crabbing mode, the mobile unit 12 would only be moving in the width direction 60 (as shown in FIG. 1) such that this direction is more critical, and requires a larger distance for the laser curtain pattern 200, whereas, there is no movement in the axial direction 50 (as shown in FIG. 1) in the crabbing mode, such that the important safety feature is merely preventing entry to the inner zone 16 of the mobile unit 12 while it is operating. It will be appreciated that the axial and width extents may be different to suit other agricultural applications.

FIG. 6 shows the mobile autonomous agricultural system 10 with a laser curtain pattern 300 in an entry mode. The entry mode is selected by the safety module 26 when a second deviating criterion is met. In this example, the second deviating criterion comprising the mobile unit 12 being controlled to approach the rows 40, from outside the rows 40, and the signal from the location module 24 indicating that the mobile unit 12 is within a first threshold distance from an end of a row 40. In this example, the first threshold distance is the same as the maximum axial distance 30. In other examples, it will be appreciated that the threshold distance may be any suitable distance.

In this example, the laser curtain pattern 300 in the entry mode extends from the wheels 14 of the mobile unit 12, along the axial direction 50 up to the maximum axial distance 30, and in the width direction 60 up to the maximum width distance 32 (i.e., with a similar pattern to the default mode). The laser curtain pattern 300 in the entry mode differs from that in the default mode by the laser curtain pattern 300 excluding at least one channel 38 from processing by the safety module 26, which channel 38 corresponds to the position of the row 40. This channel 38 ensures that the safety output from the safety module 26 is not erroneously generated by the posts and crops in the rows 40, while maintaining the laser curtain pattern 300 to surround the rest of the mobile unit 12, particularly between the mobile unit 12 and the rows 40, where there remains a risk of crushing a person therebetween. The channel 38 may be configured to grow dynamically based on the location of the mobile unit 12 relative to the row 40. For example, as the mobile unit 12 is entering a row 40, the channel is configured to grow to accommodate the row 40 while ensuring that the rest of the space between the end of the row 40 and the mobile unit 12 remains covered by the laser curtain pattern.

In other examples, the laser curtain pattern for the entry mode may be similar to the crabbing mode, and the first threshold distance may be the same as the minimum axial distance. Alternatively, the laser curtain pattern may have any suitable extents, while excluding at least one channel corresponding to the row. For example, the entry mode may be similar to the default mode excluding the channel when the deviating criterion is met directly after the default mode has been active, and the entry mode may be similar to the crabbing mode excluding the channel when the deviating criterion is met directly after the crabbing mode has been active.

FIG. 7 shows the mobile autonomous agricultural system 10 with a laser curtain pattern 400 in a row mode. The row mode is selected by the safety module 26 when a third deviating criterion is met, the third deviating criterion comprising the mobile unit 12 being within a second threshold distance from an end of a row 40 or within the row 40 (i.e., with a row 40 received within the inner zone 16 of the mobile unit 12).

In this example, the laser curtain pattern 400 in the row mode extends from the wheels 14 of the mobile unit 12, along the axial direction 50 up to the maximum axial distance 30, and in the width direction 60 up to a minimum width distance 42. In this example, the minimum width distance 42 takes the laser curtain pattern 400 up to the side laser curtain sensor 18b.

The row mode therefore ensures that the safety output from the safety module 26 is not erroneously generated by the posts and crops in the rows 40, while maintaining the laser curtain pattern 300 to surround the rest of the mobile unit 12, in any direction in which a person could approach the mobile unit 12.

Although only four modes have been described, there may be any number of different modes which take account of different configurations of rows, and of movements that the controller is configured to control the mobile unit to make. For example, the rows may be non-linear, and the modes may be configured to take account of this, and to dynamically change based on the configuration of the rows. Further, the laser curtain patterns may be dependent on the specific shape of the mobile carrier, which may have different angles of approach for a person, and therefore different potential vulnerabilities in use.

Having the laser curtain processed in different modes of operation with different laser curtain patterns, dependent on the location of the mobile unit relative to rows of crops, makes the mobile autonomous agricultural system very versatile in use while maintaining the safety of people around it.

In this example, for each of the modes of operation, the laser curtain pattern also extends downwards from each of the laser curtain sensors 18 towards the ground (best shown in FIG. 4) up to a threshold ground distance 34 from the ground. In this example, the threshold ground distance 34 is 20 cm. Limiting the laser curtain pattern for each mode of operation up to the threshold ground distance 34 means that the mobile autonomous agricultural system 10 can be used on uneven ground, as the safety module 26 will not erroneously detect an interruption in the laser curtain pattern due to an uneven surface, while still triggering a safety output for a person who may attempt to crawl under, or may be lying prone on the ground. In some examples, the threshold ground distance may be any distance between 10 cm and 50 cm. In other examples, there may be no threshold ground distance, such that the laser curtain pattern extends all the way to the ground.

Further, for each of the modes of operation, the laser curtain sensors 18 are also configured to monitor and map the ground surface, which may be uneven, undulating, or inclined. The laser curtain pattern for each mode of operation may be dynamically altered based on the mapped ground surface, for example, if it is determined that the inclination of the ground is above an inclination threshold, the laser curtain pattern may be dynamically altered to make the axial distance or the width distance for the respective mode of operation shorter.

Although the laser curtain sensors are described as projecting a laser plane, it will be appreciated that the laser plane may be a single linear laser which is moved rapidly back and forth through a plane or about a pivot axis to form an effective laser plane. Further, although it is described that there are six laser curtain sensors, there may be any suitable number of laser curtain sensors, such as a single laser curtain sensor or more than one laser curtain sensor which are configured to project a laser curtain away from the mobile unit.

Further, although the laser curtain patterns are described in specific examples above, it will be appreciated that any suitable laser curtain pattern may be used for each of the different modes of operation, and the laser curtain sensors can be angled at any suitable angle to ensure that the safety output is not erroneously generated.

FIG. 8 is a flow chart showing steps of a method 500 of controlling the powered mobile unit 12 of the mobile autonomous agricultural system 10.

In block 502, the method 500 comprises projecting the laser curtain away from the mobile unit 12 with the laser curtain sensors 18 to surround the mobile unit 12. In other examples, the laser curtain may not surround the mobile unit, but may be placed, for example, in strategic positions.

In block 504, the method 500 comprises determining the location of the mobile unit 12 relative to a row 40, based on the signal from the location module 24. For example, the safety module 26 may determine the mobile unit 12 to be in one of the following five locations, based on the location signal received from the location module 24 and optionally also a signal from the controller 20:

outside the rows 40,
approaching an end of a row 40 from outside the row 40, within a first threshold distance of an end of the row 40,
approaching an end of a row 40 from outside the row 40, within a second threshold distance of an end of the row 40;
within the row 40; or
moving between rows 40 outside the rows 40.

In this example, in block 506, the method 500 comprises determining whether any deviating criteria are met. The deviating criteria may include, for example, any of the first deviating criterion, the second deviating criterion and/or the third deviating criterion described with reference to FIGS. 5-7. It will be appreciated that other deviating criteria may be applied.

If it is determined that there are no deviating criteria met, the method 500 proceeds to block 508, in which the default mode is selected, for example, as described with reference to FIGS. 3 and 4.

If it is determined in block 506 that any deviating criteria have been met, the method proceeds to block 510 in which a mode other than the default mode is selected. For example, depending on the deviating criterion which is met, the method 500 may select a crabbing mode as described with reference to FIG. 5, an entry mode as described with reference to FIG. 6, or a row mode as described with reference to FIG. 7. As described above, each mode of operation comprises a different laser curtain pattern which is configured to be processed.

In other examples, blocks 506-510 may comprise any suitable method for selecting different modes of operation based on the location of the mobile unit relative to a row.

From both blocks 508 and 510 the method 500 proceeds to block 512, in which it is determined whether the laser curtain has been interrupted within the respective laser curtain pattern for the selected mode of operation.

If the laser curtain has been interrupted within the selected laser curtain pattern, the method proceeds to block 514 which comprises generating a safety output such as sending a signal to control the mobile unit 12 to stop, or to control the robot arms to stop, or any other suitable safety output such as described above.

If the laser curtain has not been interrupted within the selected laser curtain pattern, then the method 500 returns back to block 502 to start again. This method 500 is carried out continually to ensure the safety of users around the mobile unit 12.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

The invention claimed is:

1. A mobile autonomous agricultural system comprising:
   a powered mobile unit for carrying agricultural equipment, and configured to move along rows of crops;
   at least one laser curtain sensor configured to project a laser curtain away from the mobile unit;
   a location module configured to monitor a location of the mobile unit relative to a row;
   a controller configured to control the travel of the mobile unit;
   a safety module configured to:
      receive a location signal from the location module related to the location of the mobile unit relative to a row,
      select a mode of operation to process the laser curtain in a predefined laser curtain pattern, based on the received location signal, each mode of operation corresponding to a different predefined laser curtain pattern, and
      to generate a safety output in response to determining that the laser curtain is interrupted within the laser curtain pattern;
   wherein the safety module is configured to select a default mode of operation unless any deviating criteria are met,
   wherein the deviating criteria comprises a first deviating criterion comprising the mobile unit being controlled to move from one row to another row, wherein when the first deviating criterion is met, the safety mode is configured to select a crabbing mode, and
   wherein the crabbing mode comprises processing the laser curtain in a laser curtain pattern which extends from the mobile unit along the axial direction up to a minimum axial distance, and in a width direction, perpendicular to the axial direction, up to a maximum width distance.

2. A mobile autonomous agricultural system according to claim 1, comprising a plurality of laser curtain sensors distributed around the mobile unit configured together to form the laser curtain, and
   wherein each laser curtain sensor is configured to project a respective laser plane which overlaps with at least one other laser plane to form the laser curtain.

3. A mobile autonomous agricultural system according to claim 1, wherein the default mode comprises processing the laser curtain in a laser curtain pattern which extends from the mobile unit in an axial direction up to a maximum axial distance from the mobile unit, and in a width direction, perpendicular to the axial direction, up to a maximum width distance from the mobile unit.

4. A mobile autonomous agricultural system according to claim 1, wherein the system comprises at least one robot arm configured to perform agricultural tasks, and the safety output is a signal to control the robot arm to stop.

5. A mobile autonomous agricultural system according to claim 1, wherein for each mode of operation, each predefined laser curtain pattern, which the safety module is configured to process, extends downwards from the laser curtain sensors, up to a threshold ground distance from the ground.

6. A mobile autonomous agricultural system according to claim 1, wherein the laser curtain sensor is configured to monitor and map the ground surface.

7. A mobile autonomous agricultural system according to claim 6, wherein the safety module is configured to dynamically alter the predefined laser curtain pattern for each mode of operation based on the mapped ground surface, and
   wherein when the laser curtain sensor determines that there is an inclination in the local ground surface around the mobile unit beyond a threshold inclination, the safety module is configured to dynamically alter the laser curtain pattern which is processed, by making shorter an axial extent of the laser curtain pattern or a width extent, perpendicular to the axial direction.

8. A method of controlling a powered mobile unit of a mobile autonomous agricultural system according to claim 1, the mobile unit configured to carry agricultural equipment and configured to move along rows of crops, the method comprising the steps of:
   projecting a laser curtain away from the mobile unit;
   determining a location of the mobile unit relative to a row;
   selecting a mode of operation, to process the laser curtain in a predefined laser curtain pattern, based on the determined location of the mobile unit relative to the row, wherein each mode of operation comprises processing a different predefined laser curtain pattern;
   generating a safety output in response to determining that the laser curtain is interrupted within the laser curtain pattern; and
   selecting a default mode unless any deviating criteria is met,
   wherein the deviating criteria comprises a first deviating criterion comprising the mobile unit being controlled to move from one row to another row, and determining that the mobile unit is within a first threshold distance from an end of a row, wherein when the first deviating criterion is met the method comprises selecting a crabbing mode, and
   wherein the crabbing mode comprises processing the laser curtain in a laser curtain pattern which extends from the mobile unit along the axial direction up to a minimum axial distance, and in a width direction, perpendicular to the axial direction, up to a maximum width distance.

9. A method according to claim 8, wherein the laser curtain is projected to surround the mobile unit.

10. A method according to claim 9,
    wherein the default mode comprises processing the laser curtain in a laser curtain pattern which extends from the mobile unit in an axial direction up to a maximum axial distance from the mobile unit, and in a width direction, perpendicular to the axial direction, up to a maximum width distance from the mobile unit.

11. A method according to claim 8, wherein for each mode of operation, each predefined laser curtain pattern, which the safety module is configured to process, extends up to a threshold ground distance off the ground.

12. A method according to claim 8, comprising monitoring and mapping the ground surface and dynamically altering the predefined laser curtain pattern for each mode of operation based on the monitored ground surface, and
    comprising determining that there in an inclination in the ground surface above an inclination threshold, based on the mapped ground surface, and dynamically altering the laser curtain pattern by making shorter an axial extent of the laser curtain pattern or a width extent, perpendicular to the axial direction.

13. A non-transitory computer-readable storage medium comprising computer-readable instructions that, when read by a computer, causes the performance of a method in accordance with claim 8.

14. A mobile autonomous agricultural system comprising:
a powered mobile unit for carrying agricultural equipment, and configured to move along rows of crops;
at least one laser curtain sensor configured to project a laser curtain away from the mobile unit;
a location module configured to monitor a location of the mobile unit relative to a row;
a controller configured to control the travel of the mobile unit;
a safety module configured to:
  receive a location signal from the location module related to the location of the mobile unit relative to a row,
  select a mode of operation to process the laser curtain in a predefined laser curtain pattern, based on the received location signal, each mode of operation corresponding to a different predefined laser curtain pattern, and
  to generate a safety output in response to determining that the laser curtain is interrupted within the laser curtain pattern,
wherein the safety module is configured to select a default mode of operation unless any deviating criteria are met,
wherein the deviating criteria comprises a second deviating criterion comprising the mobile unit being controlled to approach a row, and then determining that the mobile unit is within a first threshold distance from an end of the row, such that when the mobile unit is determined to be within the first threshold distance from an end of a row, the safety module is configured to select an entry mode,
wherein the entry mode comprises processing the laser curtain to the same extent as the default mode or a crabbing mode, but excluding from processing a channel in the laser curtain corresponding to the position of the row, and
wherein the crabbing mode comprises processing the laser curtain in a laser curtain pattern which extends from the mobile unit along the axial direction up to a minimum axial distance, and in a width direction, perpendicular to the axial direction, up to a maximum width distance.

15. A method of controlling a powered mobile unit of a mobile autonomous agricultural system according to claim 6, the mobile unit configured to carry agricultural equipment and configured to move along rows of crops, the method comprising:
  projecting a laser curtain away from the mobile unit;
  determining a location of the mobile unit relative to a row;
  selecting a mode of operation, to process the laser curtain in a predefined laser curtain pattern, based on the determined location of the mobile unit relative to the row, wherein each mode of operation comprises processing a different predefined laser curtain pattern;
  generating a safety output in response to determining that the laser curtain is interrupted within the laser curtain pattern
selecting a default mode unless any deviating criteria is met,
  wherein the deviating criteria comprises a second deviating criterion comprising the mobile unit being controlled to approach a row, and determining that the mobile unit is within a first threshold distance from an end of a row, such that when the second deviating criterion is met, the method comprises selecting an entry mode,
  wherein the entry mode comprises processing the laser curtain to the same extent as a default mode or a crabbing mode, but excluding from processing a channel in the laser curtain corresponding to the location of the row, and
  wherein the crabbing mode comprises processing the laser curtain in a laser curtain pattern which extends from the mobile unit along the axial direction up to a minimum axial distance, and in a width direction, perpendicular to the axial direction, up to a maximum width distance.

16. A non-transitory computer-readable storage medium comprising computer-readable instructions that, when read by a computer, causes the performance of a method in accordance with claim 15.

17. A mobile autonomous agricultural system comprising:
a powered mobile unit for carrying agricultural equipment, and configured to move along rows of crops;
at least one laser curtain sensor configured to project a laser curtain away from the mobile unit;
a location module configured to monitor a location of the mobile unit relative to a row;
a controller configured to control the travel of the mobile unit;
a safety module configured to:
receive a location signal from the location module related to the location of the mobile unit relative to a row,
select a mode of operation to process the laser curtain in a predefined laser curtain pattern, based on the received location signal, each mode of operation corresponding to a different predefined laser curtain pattern, and
to generate a safety output in response to determining that the laser curtain is interrupted within the laser curtain pattern,
wherein the safety module is configured to select a default mode of operation unless any deviating criteria are met,
  wherein the deviating criteria comprises a third deviating criterion comprising the mobile unit being within a second threshold distance from an end of a row or within the row, such that when the third deviating criterion is met, the safety module is configured to select a row mode, and
  wherein the row mode comprises processing the laser curtain to form a laser curtain pattern which extends from the mobile unit along the axial direction up to a maximum axial distance, and in a width direction, perpendicular to the axial direction, up to a minimum width distance.

18. A method of controlling a powered mobile unit of a mobile autonomous agricultural system according to claim 17, the mobile unit configured to carry agricultural equipment and configured to move along rows of crops, the method comprising:
  projecting a laser curtain away from the mobile unit;
  determining a location of the mobile unit relative to a row;
  selecting a mode of operation, to process the laser curtain in a predefined laser curtain pattern, based on the determined location of the mobile unit relative to the row, wherein each mode of operation comprises processing a different predefined laser curtain pattern;
  generating a safety output in response to determining that the laser curtain is interrupted within the laser curtain pattern
selecting a default mode unless any deviating criteria is met,
  wherein the deviating criteria comprises a third deviating criterion comprising the mobile unit being within a second threshold distance from an end of a row, such that when the third deviating criterion is met, the method comprises selecting a row mode, and wherein the row mode comprises processing the laser curtain to form a laser curtain pattern which extends from the mobile unit along the axial direction up to a maximum axial distance, and in a width direction, perpendicular to the axial direction, up to a minimum width distance.

19. A non-transitory computer-readable storage medium comprising computer-readable instructions that, when read by a computer, causes the performance of a method in accordance with claim 18.

* * * * *